United States Patent [19]

Groeger

[11] 4,165,846
[45] * Aug. 28, 1979

[54] CONVERTIBLE AIRPLANE

[76] Inventor: Theodore O. Groeger, 2 Collamore Cir., West Orange, N.J. 07052

[*] Notice: The portion of the term of this patent subsequent to Mar. 15, 1994, has been disclaimed.

[21] Appl. No.: 797,955

[22] Filed: May 18, 1977

Related U.S. Application Data

[63] Continuation-in-part of Ser. No. 774,076, Mar. 3, 1977, abandoned, which is a continuation-in-part of Ser. No. 616,574, Sep. 25, 1975, Pat. No. 4,011,919.

[51] Int. Cl.² .............................................. B64C 37/00
[52] U.S. Cl. ............................................ 244/2; 244/36
[58] Field of Search ...................... 244/2, 13, 36, 218, 244/219, 215, 213, 129.5; 180/7 R; 296/1 S, 26, 27, 99, 91; 115/1 R

[56] References Cited

U.S. PATENT DOCUMENTS

| | | | |
|---|---|---|---|
| 1,452,394 | 4/1923 | Simon | 296/26 |
| 2,084,116 | 6/1937 | Zaruba | 180/7 R |
| 2,118,254 | 5/1938 | Loedding | 244/36 |
| 2,353,820 | 7/1944 | Eddins | 296/99 |
| 2,681,773 | 6/1954 | Rethorst | 244/2 |
| 2,811,323 | 10/1957 | Rethorst | 244/2 |
| 2,923,494 | 2/1960 | Strong | 244/2 |
| 3,029,042 | 4/1962 | Martin | 244/2 |
| 3,119,441 | 1/1964 | Furry, Jr. | 244/129.5 |
| 3,498,399 | 3/1970 | Gaskini | 115/1 R |
| 4,011,919 | 3/1977 | Groeger | 115/1 R |
| 4,017,041 | 4/1977 | Nelson | 244/213 |

FOREIGN PATENT DOCUMENTS 776278  1/1935  France .................................. 296/1 S Primary Examiner—Galen L. Barefoot
Attorney, Agent, or Firm—Theodore O. Groeger

[57] ABSTRACT

A land-, air- and water-vehicle comprising a rolling, floatable and steerable fuselage, the roof-hinged doors of which serve as its wings, and which fuselage's lateral and rear portions are extendable into an airfoil with attached fins and stabilizer, whereby wings, fuselage and stabilizer provide sufficient aerodynamic lift.

9 Claims, 3 Drawing Figures

CONVERTIBLE AIRPLANE

CROSS-REFERENCES TO RELATED APPLICATIONS

This is a continuation-in-part of application Ser. No. 774,076, filed Mar. 3, 1977 (now abandoned), which is a continuation of application Ser. No. 616,574, filed Sept. 25, 1975, now U.S. Pat. No. 4,011,919, issued Mar. 15, 1977.

BACKGROUND OF THE INVENTION

Overspecialization and abundant energy and monetary resources resulted in much too many types of motor vehicles, the acquistion and maintenance of which became a heavy burden for the taxpayer. Therefore, standardized multipurpose vehicles will be at least "useful for the reduction of military budgets" throughout a necessarily peaceful world.

Viewed from today's state of the art it appears disadvantageous: (a) to spend more than a million dollars for small military training airplanes each, but one generation past the times when applicant was required to train for his pilot's license in a do-it-yourself "spruce goose"; (b) to fly with oversized wings, when the fuselage could provide lift also; (c) to separate the airplane's engines, wings, fins and/or stabilizers thus far from their common center of gravity that stability and parking problems arise; (d) to utilize overly voluminous vehicle doors for the sole purpose of hiding a window-pane, even a motor for it and/or an ashtray; (e) to put tons of aircraft machinery on tiny wheels, necessitating expensive airstrips; (f) to build under-utilized jumbo-jets for even larger and more distant airports, instead of a fleet of better manageable multipurpose vehicles, having access to urban centers and the more important seaports as well.

Accordingly, the main purpose of this invention is the simplification of the airplane, designed for more reasonable and safer speeds, smaller and rugged landing sites, as well as common parking facilities.

A further object of this invention is to emphasize the versatility of the Tireroller according to U.S. Pat. No. 4,011,919, which offers a simpler, stronger and gyroscopically stabilized undercarriage for rugged terrain and water; two large tire-belts for turning distant propeller shafts with low-laying driving means; large doors for the utilization as wings, and a semicylindrical body useful as the frontal portion of an airfoil, easily completed with a drawn-out floor section, several rods and some canvas or silk.

According to U.S. Pat. No. 4,017,117 automobiles are known with upwardly opening, roof-hinged doors, and small airplanes with folding wings were built for seagoing carriers. Moreover, U.S. Pat. No. 4,017,041 teaches an airfoil tip vortex control with a collapsible foil oriented substantially perpendicular to one surface of said airfoil.

SUMMARY OF THE INVENTION

The present invention concerns and has for its object the provision of a simple airplane, ranging from a glider, small multipurpose motor vehicle, airbus and aquaplane, to a port-connecting cargoplane.

Said airplane comprises: (a) a fuselage having a leading edge, a trailing edge, a bottom surface and a larger upper surface, both of which surfaces extend into said edges; (b) two fins attached to opposite sides of said fuselage, substantially parallel to its longitudinal centerline and about perpendicular to said edges, both of which fins project substantially away from said upper surface adjacent to said trailing edge; (c) two wings, each attached to said opposite fuselage sides adjacent to said leading edge, and being substantially perpendicular to said fins and (d) at least one stabilizer attached to said fuselage adjacent to its trailing edge, whereby the sum of the dynamic reactions of the air against said fuselage, wings and stabilizer sufficiently lifts said airplane from the surface in use.

Moreover, this invention concerns any new part and combination of parts disclosed herein, the process for their manufacture, as well as their use.

Figure 2:
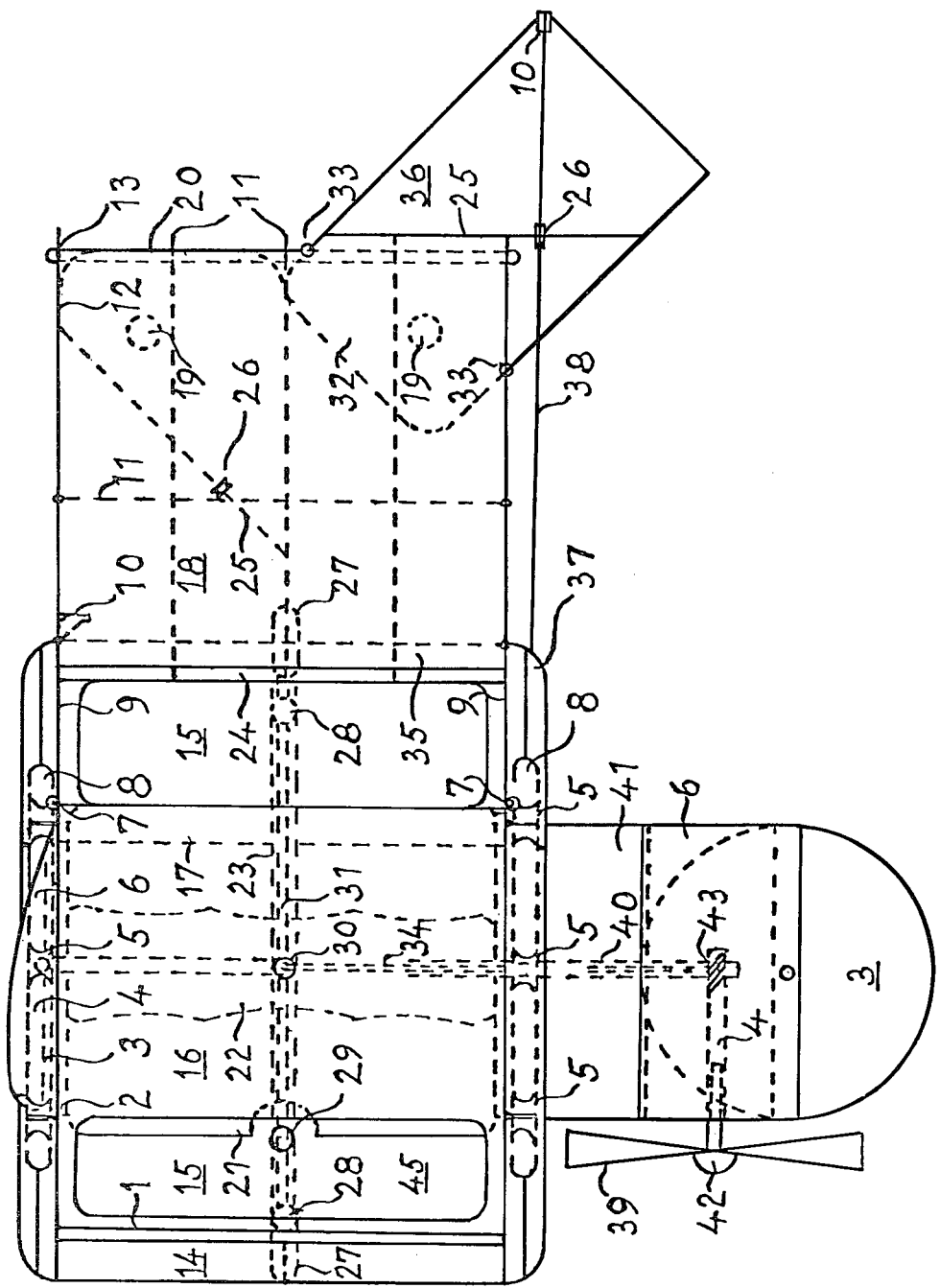
FIG. 2 is the corresponding top view of said six-seated Tireroller, the wing and stabilizer of which on its left side are in the operative positions, and those on the right side in the retracted positions.

In order to ease the finding of the reference numerals, they are arranged in FIG. 2 within lines and in the natural sequence.

DETAILED DESCRIPTION OF THE PREFERRED EMBODIMENTS

Figure 1:
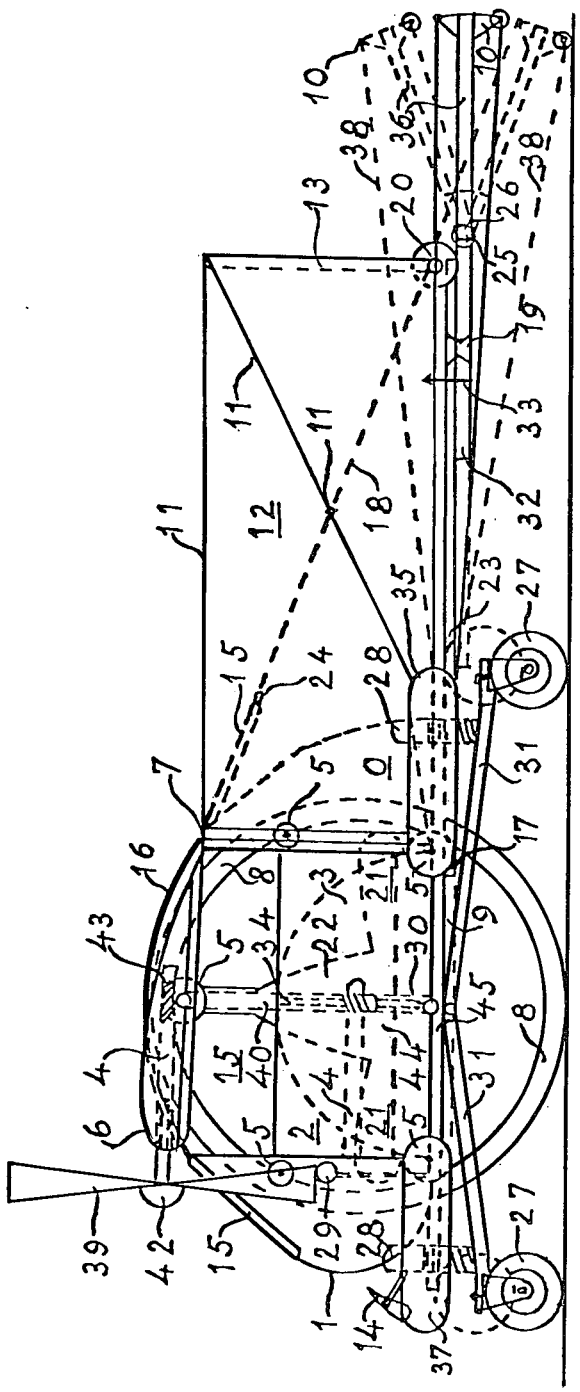
FIG. 1 is a side view of a two-door Tireroller, adapted to a simple airplane according to this invention, at take-off.

Referring to FIGS. 1 and 2, depicting a very simple embodiment of this invention, there is shown a fuselage 0, with the leading edge 1 and the trailing edge 20. Its bottom surface is composed of the rigid floor-part 45 and the extended part 17, connected to the former and the fuselage in a drawer-like fashion by means of the guide-rails 9 (in the retracted position 17 is merely the lower double-floor of 0). The bottom surface-part 17 carries the middle-portion of the rear-bumper 35, which is composed of two detachable half-shells, providing the slat 14, to be mounted at the front-bumper near the fuselage's leading edge 1. Its trailing edge is provided by the rod 20, rotatably attached to said surface 17, and carrying, like a window-shade, the flexible part 18 of the fuselage's upper surface. It is unwound from 20 and attached to the lower frame 24 of the roof-hinged rear-window 15. The remaining rigid part of said upper surface is the roof 16 and the windshield 15. The total area of the fuselage's upper surface is about 1.1 to 1.4, preferably 1.2 times larger than that of the bottom surface, which latter is preferably about 2-3 squares of its trailing edge.

The fins 12 are similarly unwound from the rods 13, which are secured to said extended part of the bottom surface 17 next to the ends of its trailing edge 20. The other ends of the flexible fins 12 are slid into slots 7 of the fuselage 0 and secured therein next to the hinges of the rear-window 15 and the driving rollers 5. Both, the flexible upper surface-part 18, and the fins 12, are stiffened and attached to each other by the rods 11, which are either pushed through middle-seams therein and hooked into the window-frame 24, or stringed sequentially through ears in the outer-seams of 18 and in the diagonal-seams of 12. Moreover, the upper tip of the rod 13 is braced against the rear-bumper 35 by another rod 11, also slid through a seam of 12 and ears of that rod 11, which is perpendicular to the fuselage's lingitudinal centerline, whereby said flexible parts 12 and 18 are sufficiently stabilized, and protected from undue vibrations as well. Said ten rods 11 are bundled together with the fin-rolls 13 and deposited in the front-bumpershell carrying the slat 14. However, said flexible parts may also be reinforced by similar tubes, cables and/or bags of presurized gas (like an air-mattress or windbag), and they are composed of either woven or extruded materials, such as canvas, parachute-nylon, poly-(ethylene or vinylchloride).

The wings 6 are hinged, together with the fuselage's inner doors 2 (containing the slideable pane of the sidewindow 15), at the fuselage's roof 16. Said wings comprise the semicircular wingtip 3 (rotatable into 6), the propellershaft 4, its worm- or bevel-gear 43, a slideable upper surface 41, and such lower surface 44, both of which close the opening for the side-window 15. Having lifted said wings 6 into the operative position, the hollow driving shaft 40 is slid through the uppermost roller 5, along the roof-secured axle 34, and connected with the pin of the gear 43, whereby the roller-driven shaft 40 not only turns the propeller-shaft 4, but also arrests said outer door-wings 6 in the operative position. The propellers 39, at their pins 42, are merely screwed or slid into the hollow shafts 4 and fastened therein by a security-pin. Thereupon the wing's opening is closed by sliding the surfaces 41 and 44 towards the roof 16.

The stabilizer is composed of two halves, having a total area of about said fuselage's bottom part 17, to which they are secured by the nuts 19. Said halves are rotated out from beneath the surface 17 and arrested thereon by the pins 33, whereby their edges preferably form an angle with the trailing edge 20, from about 110° to 180°, advantageously from about 120° to 150°. Each of said halves is composed of the arrested part 32 and the stabilizer's moving part 36, connected to the former by the hinge 25. Said hinged stabilizer-parts 36 are moved independently from each other via the cables 38, which are attached to the folding levers 10, and guided by the rollers 26. By this dovetail-like action of the stabilizer, the ailerons and rudder become superfluous (but may, if desired, also be used in known manner). Said simplified mode of steering within the air is augmented by the gyroscopic reaction of the fast rotating tires 8, which augments every twisting action of said stabilizer-parts 36 (e.g. left up and right down) by a rotation of the fuselage around its centercolumn 30. This rotation is magnified by the uneven spin of the propellers 39, due to the independent control of the tires 8, so that the steering of the vehicle by the joystick 29 remains identical on land, in water and in the air. Said parts 36 may also serve as an airbrake on ground, i.e. when raised into an about vertical position by the upper cables 38.

The undercarriage of the vehicles according to this invention is either conventional, or preferably provided by the elastic tires 8 according to U.S. Pat. No. 4,011,919, and the swivelwheels 27 at the telescoping swing-arms 31, which are suspended against the floorsection 45 (with the stabilizing cable-duct 23 therein) by the shock-absorbers 28. These are filled with a fluid in the cylinder's upper portion, a floating piston and a spiral spring in the lower portion, whereby the suspending force of the frontal wheel 27 is increased by the pumping action of a brake pedal, withdrawing liquid from the shock-absorber 28 in the rear and forcing it into that up front. The outer parts 37 of the bumpers 35 can be screwed off, together with tire-covering fuselage-parts and outer roller-halves, for mounting a new tire 8.

Said vehicles are driven and braked by four electric motor/generators, the shafts of which carry the rollers 5 next to the ground, and the current is provided by a plurality of batteries located beneath the seats 21. A portable engine-generator assembly may be slid between the backs 22, together with its fuel-tank, for providing additional current, or most of it while flying, so that battery-ballast can be removed. Said assembly is advantageously a Wankel engine flanked by two generators, also serving as its starter. Said driving motors are controlled by the joystick 29, which also throttles said engine and turns a four-pole switch, a rheostat and/or a graduated transformer, which latter adjusts the voltage of any generated alternating current for the rectifyer, batteries and/or braking-rheostats in known manner. Conventional driving means may, of course, also be used for said rollers 5, and/or brakes.

For aquatic use both the outer wing-door 6 and attached inner door 2 are closing the fuselage 0 watertight, and the tires 8 are augmented either with lateral waterblades, or self-opening rubber-pockets. Moreover, the retracted bottom surface-part 17 may add to the buoyancy when composed of a light, cellular material, such as plywood or fiber-reinforced plastic, preferably filled with styrofoam, which part may also be molded into a conventional flat boathull carrying, if desired, the stabilizer-parts 32 on top, i.e. between 45 and 17.

Figure 3:
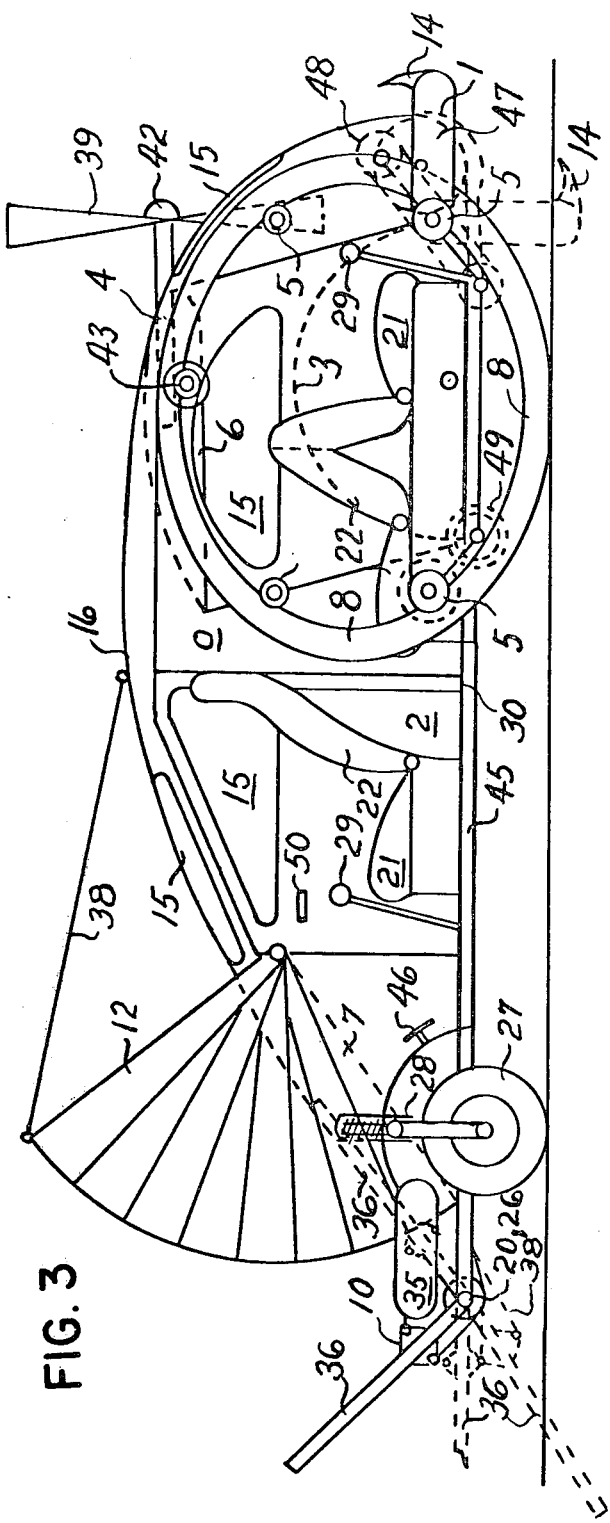
FIG. 3 is a cross-sectional view of a two-directional four-door Tireroller (driving to the left and flying to the right) with retractable fantail and stabilizer, after landing.

Referring to FIG. 3, depicting a more sophisticated embodiment of this invention, there is shown the fuselage 0, its leading edge 1, trailing edge 20, bottom surface 45 and upper surface composed, in part, of the front- and rear-windows 15 and the roof 16. Both fins 12 are fans composed of a plurality of blades, which are held in the extended position by the cables 38. The latter may also serve as antenna and/or the base of an additional, flexible fin-part, closing the triangle formed by 38, the upper blade of 12 and the upper frame of the rear-door with its handle 50, which frame would merely pinch said flexible part of 12 into operating position.

The left wing 6 is shown in both the operating and retracted positions. It is composed (as described previously) of the inner front-door 2 with the side-window 15, the rotatable, semicircular wingtip 3, the propellershaft 4, the bevel- or worm-gear 43 and said slideable parts closing the window-opening. When lifted into operating position, said outer wing-door 6 is held therein by the telescoping shaft of the upper roller 5, fitting into the pin of the gear 43, to which it is secured by nuts or bolts. Similarly the pins 42 of the propellers 39 are inserted into the shafts 4.

The stabilizer parts 36 are either similar to those described above, or they are constructed analogous to said fan-fins 12. Both of such fan-tails 36 are extended from their horizontal base (under the bumper 35) rear- and outwardly, and said base is hinged at the trailing edge 20, and moved by the cables 38 at the levers 10 thereon. Said cables are guided by the rollers 26 to the steering (joy) stick 29 next to the leading edge 1.

For driving this Tireroller on land, the fins 12 are retracted into the lateral slots 7, and the stabilizers 36 folded back under the front-hood as indicated. Similarly, the wingtips 3 are rotated about 180°, the propellers disconnected and the wings 6 lowered and attached to the inner doors 2. Two electric motors 47 drive the rear-rollers 5 by a pulley- or spurgear-transmission 48, and an about 100° rotation of said motors 47 around their center-bearings lowers said rollers 5 as indicated, whenever a heavy load requires this. The front-rollers 5 are attached to the shafts of electric generators 49, which also can be lowered at a guide-rail within a sheath at both vehicle's sidewalls. Said lowering of the rollers 5 next to the ground takes place automatically whenever 49 brakes, or 47 accelerates, and said guide-rails or transmission 48 need merely be arrested or released in the desired upper or lower positions by cables or levers. The batteries for said motor/generators are placed into drawers beneath the seats 21 (extending through the doors) from which they may be removed for inserting a Wankel-generator and its fuel-tank. The seats 21 and their backs 22 in the rear may also be folded towards the centercolums 30, in order to provide for a loading platform above said battery-drawers; or 21 and 22 are stretched out thereon, for providing a mattress.

Both wheels 27 at the shock-absorbers 28 are conventionally steered by both joysticks 29, which control said motor/generators and engine also, as mentioned before, and the brake-pedal 46 activates a conventional diskbrake at the wheels 27. If aquatic use is desired, the bottom surface 45 is again made more voluminous and provided with the conventional contour.

Even aquaplaning is possible with this Tireroller by means of the propeller-drive and rised, but unextended wings (3 retracted) and lowered bumper 35, as well as partly opened fan-stabilizers 36, whereby the slat 14 acts as hydrofoil also and the stabilizers 36 steer and tilt the vehicle in water. If desired, the lower, telescoping parts of the shock-absorbers 28 may be disconnected from the springs therein, in order to retract the wheels 27 into the uppermost positions for both flying or aquaplaning, e.g. by means of a pulling cable. As mentioned before, the water-drive of the tires 8 may be enhanced by inserting small, lateral blades into proper nuts therein.

If not mentioned already, the vehicles according to this invention are constructed of any suitable material, and by methods consistent with conventional engineering techniques for purpose-similar parts, e.g. those disclosed in said patents. Their batteries may be recharged in conventional manner, or by means of solar-cells in their roof 16 and/or wings 6. Moreover, in windy coastal regions said vehicles need merely be propped up, e.g. that according to FIG. 3 into the aquaplaning position on land, so that the tires 8 are off the ground and the propellers 39 drive the generators 49 via the tire-pulleys, while the trailing edge 20 is pointing against the wind. Variously, the plywood wingtips 3 are merely disconnected and used as prop-up "wheels," by inserting their pin into a proper bearing within the floor 45 or inner doors 2, whereupon the vehicle is pushed until 3 is turned about 90°–180°.

I claim:

1. In an airplane including a fuselage having a leading edge having on opposite sides at least three rollers rotatably mounted on substantially horizontal axles, which are distributed over substantially the periphery of said fuselage-sides and connected therewith, a pair of elastic running tires contacting the ground in use and said rollers, at least one ground-contacting balancer, which is resiliently and rotatably connected with another side of said fuselage, power means operatively connected with said airplane and braking means operatively connected with said airplane and only a frontal pair of said rollers adjacent to the leading edge and to the ground; wherein said fuselage (0) comprises; (a) said leading edge (1) next to said frontal rollers, a trailing edge (20), a bottom surface (17, 45) and a larger surface (15, 16, 18), both of which surfaces extend into said edges; (b) two fins (12) attached to opposite sides of said fuselage, substantially parallel to its longitudinal centerline and about perpendicular to said edges, both of which fins project substantially away from said upper surface adjacent to said trailing edge; (c) two wings (3, 6), each attached to said opposite fuselage-sides adjacent to said leading edge and being substantially perpendicular to said fins and (d) at least one stabilizer (32, 36) attached to said fuselage adjacent to its trailing edge, whereby the sum of the dynamic reactions of the air against said fuselage, wings and stabilizer sufficiently lifts said tireroller from the ground in use.

2. An airplane according to claim 1, wherein said fuselage's bottom surface is composed of at least two rigid parts (45 and 17), slideably connected to each other in the direction of the fuselage's longitudinal centerline.

3. An airplane according to claim 1, wherein the fuselage's upper surface is composed of at least two parts, that containing the leading edge being rigid (15, 16), and that containing the trailing edge being flexible (18).

4. An airplane according to claim 3, wherein said flexible surface (18) is reinforced by a plurality of solid members (11).

5. An airplane according to claim 1, wherein said fins (12) are composed of a plurality of solid fanblades.

6. An airplane according to claim 1, wherein the wings are part of said fuselage's doors (2, 6), which are hinged at its upper surface (16).

7. An airplane according to claim 6, wherein said wings comprise: (a) a bottom and an upper surface, each with slideable sheets (41, 44) closing an opening therein; (b) a substantially semicircular wingtip (3) rotatable through the wing's side opposite to its hinges; (c) a propeller shaft (4) substantially parallel to said side; (d) a driving shaft (40) substantially perpendicular to said side and (e) a gear (43) connecting said shafts.

8. An airplane according to claim 1, wherein the stabilizer is composed of a pair of at least two rigid parts (32 and 36) hinged to each other.

9. An airplane according to claim 1, wherein said fuselage and said wings are so dimensioned that they provide about equal lift within the air, the dynamic reaction of which is generated by two propellers (39), each of which is rotatably connected with said wings.

* * * * *

UNITED STATES PATENT AND TRADEMARK OFFICE
CERTIFICATE OF CORRECTION

PATENT NO. : 4,165,846
DATED : Aug. 28, 1979
INVENTOR(S) : Theodore O. Groeger

It is certified that error appears in the above-identified patent and that said Letters Patent are hereby corrected as shown below:

Page 1, Column 1, line 2 under "[63]", cancel "-in-part";

Page 1, Column 2, line 9, change "Gaskini" to ---Gaskins---.

Column 3, line 3, change "lin-" to --- lon- ---.

Column 6, line 13, after "larger" insert ---upper---;

Signed and Sealed this

Twenty-ninth Day of January 1980

[SEAL]

Attest:

SIDNEY A. DIAMOND

Attesting Officer

Commissioner of Patents and Trademarks